(12) United States Patent
Bertrand

(10) Patent No.: US 7,044,252 B1
(45) Date of Patent: May 16, 2006

(54) SYSTEM FOR CONNECTING THE FRONT AND BACK WHEEL OF TWO-WHEELED VEHICLES AND VEHICLE OBTAINED WITH SAID METHOD

(76) Inventor: Juan Elizalde Bertrand, Ganduxer no 118, E-08022, Barcelona (ES)

( * ) Notice: Subject to any disclaimer, the term of this patent is extended or adjusted under 35 U.S.C. 154(b) by 0 days.

(21) Appl. No.: 09/868,653

(22) PCT Filed: Dec. 28, 1999

(86) PCT No.: PCT/ES99/00406

§ 371 (c)(1),
(2), (4) Date: Dec. 1, 2003

(87) PCT Pub. No.: WO00/40453

PCT Pub. Date: Jul. 13, 2000

(30) Foreign Application Priority Data

Dec. 30, 1998 (ES) .................... 9900054

(51) Int. Cl.
*B62D 61/02* (2006.01)
(52) U.S. Cl. ...................... 180/219; 280/269
(58) Field of Classification Search ............ 280/267, 280/269, 263, 285, 286, 200; 180/219
See application file for complete search history.

(56) References Cited

U.S. PATENT DOCUMENTS

| 4,526,249 | A | * | 7/1985 | Parker .................. 180/219 |
| 4,638,881 | A | * | 1/1987 | Morioka et al. ............ 180/219 |
| 4,821,833 | A | * | 4/1989 | Yamaguchi ................. 180/219 |
| 5,417,305 | A | * | 5/1995 | Parker .................. 180/219 |
| 5,503,244 | A | | 4/1996 | Beirlein |
| 6,474,432 | B1 | * | 11/2002 | Schmidt et al. ............ 180/209 |
| 6,763,905 | B1 | * | 7/2004 | Cocco et al. .............. 180/210 |

FOREIGN PATENT DOCUMENTS

| EP | 0 469475 | 2/1992 |
| JP | 11 079042 | 3/1999 |

* cited by examiner

*Primary Examiner*—Tony Winner
(74) *Attorney, Agent, or Firm*—Dennison, Schultz, Dougherty & MacDonald

(57) ABSTRACT

A method of interconnecting the front and rear wheels in two-wheeled vehicles and a vehicle produced in accordance with the method is characterized in that, in order to prevent opposing couples being generated in the respective wheels and acting on the steering column of the vehicle, bringing about disequilibrium thereof, the steering column is dispensed with and a module attached to the rotation axle of the front wheel is connected to an upwardly inclined member which is further extended downwardly and is articulated at its other end to an end of a transverse bar for connection to the rear wheel of the vehicle, this rear wheel taking part in deflections which the steerable wheel may perform.

4 Claims, 2 Drawing Sheets

SYSTEM FOR CONNECTING THE FRONT AND BACK WHEEL OF TWO-WHEELED VEHICLES AND VEHICLE OBTAINED WITH SAID METHOD

The subject of the present patent of invention is a two-wheeled vehicle with its steerable front wheel and its rear wheel interconnected.

Conventionally, the steering column of the steerable wheel of a two-wheeled vehicle is positioned above the steerable wheel, within the plane of symmetry thereof, and displaced rearwardly, forming a small angle to the vertical, this characteristic enabling the wheel to be steerable.

Stability and manoeuvring at low speed are achieved by balancing performed by the rider.

Stability at faster speeds of more than approximately 20 km per hour is achieved by the rotation of the wheels and the resulting gyroscopic forces. Manoeuvring is performed by moving the body weight towards the inside of the turn and/or by an appropriate slight turning pressure on the steerable wheel.

In motorized bicycles, conventional motorcycles and the like, the front and rear wheels of the vehicle are connected to one another by means of the steering column which is disposed above the front wheel so that a stable equilibrium is developed, provided that the paths of both wheels are identical. If this is not the case for various reasons such as bouncing of a wheel, a sideways movement due to skidding, or any other reason, the couples exerted by the wheels on the steering column may produce opposing force components which unbalance the vehicle because the paths are altered momentarily in opposite directions, since the couple on the rear wheel is borne by the steering column but not by the front wheel axle.

These unequal steering forces, which are created momentarily, may and do give rise to force components that unbalance the vehicle, which may cause both the vehicle and its rider to fall over.

The necessary correction of this instability, which is not always successful, is achieved in most cases by the well-directed effort of an experienced rider.

Prototypes in which an attempt to achieve this objective is indicated have been disclosed in motorcycling magazines. However, this is applicable only to racing motorcycles, owing to their large size which is necessary to achieve maximum power within their cylinder capacity.

This larger size permits the arrangement of the complex structural components which are necessary in order partially to achieve the desired result.

These solutions cannot be applied to motorcycles for general use, such as scooters, touring motorcycles, non-competitive motorcycles for transporting a rider from one place to another, off-road motorcycles, etc.

On the other hand, some improvements have been proposed concerning the construction of front arms for motorcycles and the connection between the wheels, none of them as successful as the present invention.

For example, U.S. Pat. No. 4,638,881 of Minoru Morioka et al. (1987), discloses a structure that connects both the front and rear wheels of a motorcycle by using a laminated plate (41), with no volume, that has the pivot points of the vehicle arms (24 and 28) at the spaced-apart ends of the wheel axle. Hence, the rear wheel does not cooperate with the direct connection to the rotation axle (46), which brings about displacements of the wheel axle and negative malalignments thereof, failing to attain constant equal wheel paths of the front and rear wheels.

The failure to attain instant cooperation of the rear wheel with respect to the directional movements of the front wheel is also present in U.S. Pat. No. 5,503,244 of Wilhelm K. Berlein (1996) and in EPO Patent no 469.475 of Cagiva Motor Italia (1991) which refers to a front suspension for motorcycles that can not prevent the malalignment of both the front and rear wheels.

Japanese Patent no 11.079.042 of Honda Motor (1997) intends to compact and lighten the front swing arms for motorcycles by means of two inverted "U" shaped bent arms (42) and (54) articulated in a angle-shaped piece that is joint to the wheel axle. Said arm (54) is not directly connected to the upper end of the piece (43) but through an intermediate lever (55*b*). Consequently, in this case there is no connection of the rear wheel to the front wheel axle either, and as a result the negative malalignments between them can not be prevented.

In spite of the structural elements which have been introduced in very large motorcycles, the movement of the front wheel from right to left and vice versa is still limited. The extent of this limitation is such that, in narrow parking spaces, the parking of a racing motorcycle is very difficult and laborious owing to the large number of manoeuvres that the motorcycle rider is forced to perform in order to align the motorcycle between the lines delimiting the parking space.

The subject of the present invention increases the amplitude of the lateral movements of the front wheel, thus increasing the likelihood of the rear wheel being aligned with the front wheel, in spite of difficulties encountered on the surface of the road or track and, moreover, facilitating parking of very large motorcycles.

For a correct interpretation, a practical embodiment of the subject of the invention is described by way of non-limiting example below, with reference to the two appended sheets of drawings, in which.

Figure 1:
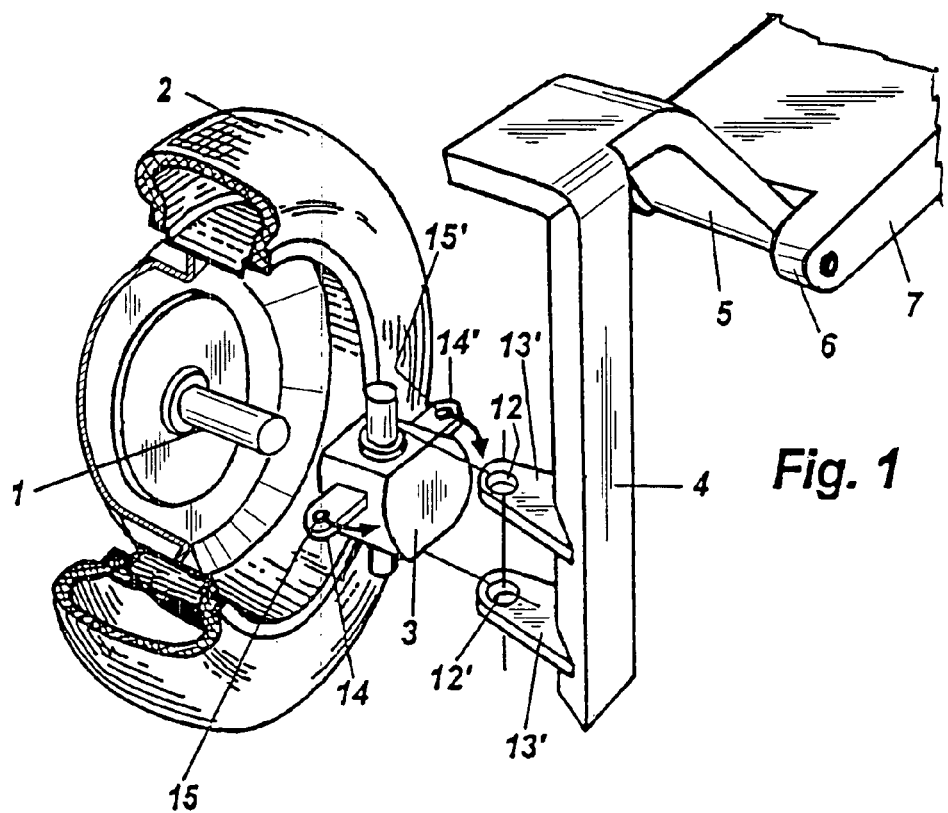
FIG. 1 is a partially sectioned, exploded, perspective view of the front, steerable wheel of a two-wheeled vehicle and the mechanisms which are attached to the front wheel and to the rear, driving wheel of the vehicle.
Figure 2:
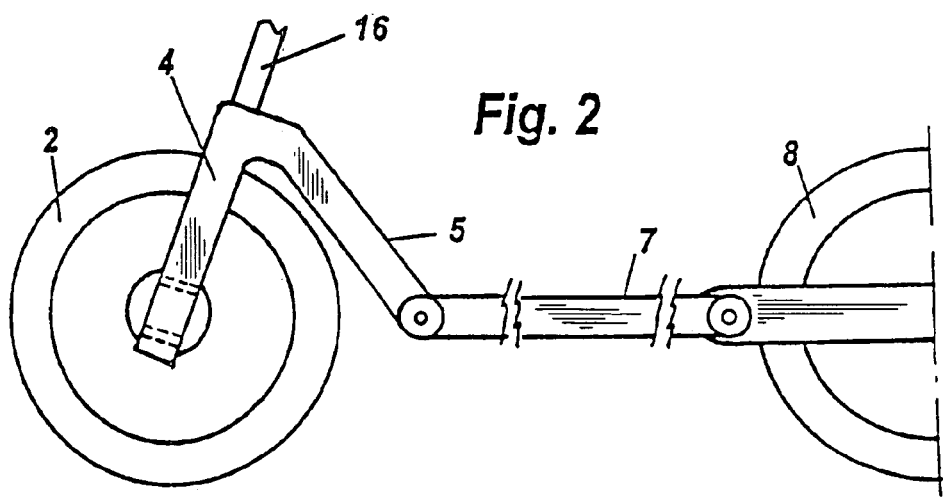
FIG. 2 shows schematically, the connection of the rear, driving wheel to the axle of the front, steerable wheel, the horizontal connecting bar being shortened.
Figure 3:
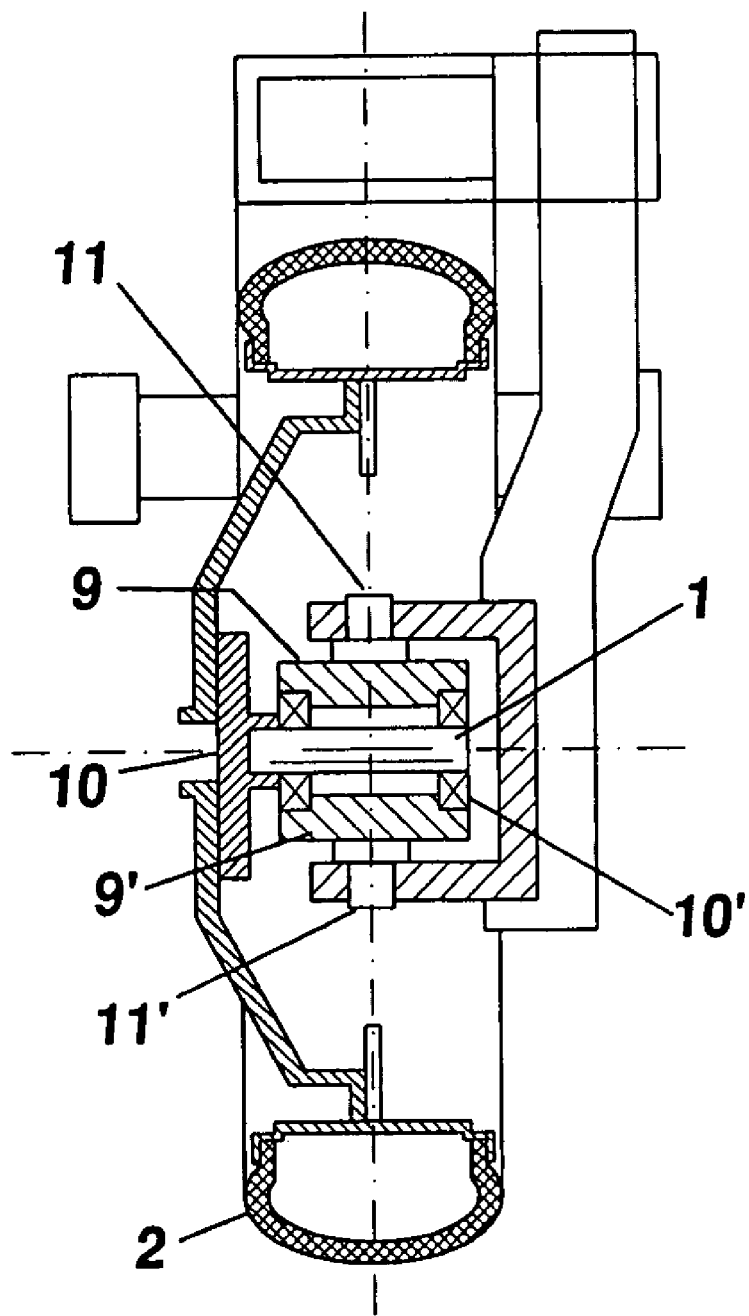
FIG. 3 is a schematic view of the steerable wheel, sectioned to show the presence of the module, shown exploded and aligned, which is attached to the rotation axle of the steerable wheel, and the member for connection to the rear wheel.

The invention consists in that, in order to achieve stable equilibrium of the two-wheeled vehicle, preventing the action of the two independent couples which may be created momentarily in known two-wheeled vehicles and which act on a steering column 16 of the vehicle simultaneously and in opposition, the steering column is dispensed with and a module 3 is attached to the rotation axle 1 of the steerable wheel 2, the module 3 being connected at least to an upwardly inclined member 4 which is extended downwardly 5 and is articulated at its end to an end 6 of the transverse connection bar 7 which is connected at its other end to the rear wheel 8 of the vehicle.

The axle of the rear wheel 8 thus in turn also bears on the same module 3 as the front wheel 2, as indicated above.

The module 3 is formed by a unit composed of an inner parallelepipedal box constituted by two upper and lower walls 9 and 9' and two longitudinal walls 10 and 10' perpendicular to the rotation axle of the front wheel carrying bearings through which the rotary axle 1 extends so as to be attached rotatably to the longitudinal walls 10 and 10'.

The longitudinal walls 9 and 9' of the box of the module 3 have respective central pins 11 and 11' which project in opposite directions and which are inserted in respective perpendicularly aligned holes 12 and 12' of flat, superposed and spaced-apart, projecting arms 13 and 13' of the inclined member 4.

In the sides of the body constituting the module 3, means are provided for the angular deflection of the module 3, and hence of the wheel to which it is permanently connected, to the right and to the left, at will, by the rider.

These means are, for example, two rigid plate-like tabs 14 and 14' which project from the module 3 at 90° to the pins 11 and 11', the ends of the tabs having respective holes 15 and 15'.

Pull operating elements (not shown) for enabling the rider of the motorcycle to pivot the module 3, and hence the wheel 2 to which it is permanently connected, to the right or to the left, are fixed in the said holes 15 and 15'.

As described above, the rear wheel bears on the module 3 of the steerable wheel 2 by means of the bar 7 and the inclined member 4.

As well as preventing the problems described above in two-wheeled vehicles, the subject of the invention also avoids the designation of space to the conventional steering column, thus freeing the designers of the two-wheeled vehicle from constraints, permitting a better mass distribution including the possibility of moving the driver's position forwards.

The invention claimed is:

1. A two-wheel vehicle with its streerable front wheel (2) and its rear wheel (8) interconnected by means of a module (3) attached to the rotation axle (1) of the front wheel (2), a steering column being dispensed with, said module (3) being connected to an upwardly inclined member (4) which is further extended backwards downwardly and is articulated to connect with the rear wheel of the vehicle, wherein said module (3) is located in the central portion of the steerable wheel and is formed by a parallelpipedal body, composed of upper and lower walls (9, 9'), two transverse longitudinal wall (10, 10') perpendicular to and receiving the rotation axle (1) of the front wheel, a pin (11, 11') projecting outwardly from the outer surface of upper and lower walls (9, 9') forming the steering axle of the front wheel.

2. A two-wheeled vehicle with its steerable front wheel and its rear wheel interconnected according to claim 1, characterized in that the said two longitudinal walls of the box of the module (3), perpendicular to the said rotation axle (1) of the said front wheel, are perforated in their centres and are provided with bearings for the insertion of the rotation axle (1) of the steerable wheel.

3. A two-wheeled vehicle with its steerable front wheel and its rear wheel interconnected according to claim 2, characterized in that the pins (10 and 11) of the module (3) of the steerable wheel are inserted in respective holes (12 and 12') in two rigid, flat, superposed and aligned arms (13 and 13') of the inclined member (4) for connection to the longitudinal bar (7) to the rear driving wheel (8).

4. A two-wheeled vehicle with its steerable front wheel and its rear wheel interconnected according to claim 3, characterized in that, in addition to the pins the module (3) has means (14 and 14') for the fixing of pull elements for the angular deflection of the steerable wheel (2) in one direction and in the other, at will, by the rider.

\* \* \* \* \*